United States Patent [19]

Kramer et al.

[11] 3,746,871

[45] July 17, 1973

[54] METHOD OF DETERMINING THE PRESENCE AND AMOUNT OF VANADIUM IN AN EARTH FORMATION

[75] Inventors: Henry H. Kramer, Mahwah, N.J.; C. Sheldon Thompson, Lewiston, N.Y.; Frank J. Cosolito, Ringwood, N.J.

[73] Assignee: Union Carbide Corporation, New York, N.Y.

[22] Filed: Dec. 2, 1970

[21] Appl. No.: 94,484

[52] U.S. Cl. .......................... 250/270, 250/363
[51] Int. Cl. .................................. G01t 1/20
[58] Field of Search ............. 250/83.6 W, 83.6 S, 250/83.3 R, 83 R, 71.5 R

[56] References Cited
UNITED STATES PATENTS 3,514,598 5/1970 Youmans ................... 250/83.3 R
3,240,938 3/1966 Hall, Jr. ..................... 250/83.6 W

*Primary Examiner*—James W. Lawrence
*Assistant Examiner*—Davis L. Willis
*Attorney*—Paul A. Rose, Frederick J. McCarthy, Jr. and Harrie M. Humphreys

[57] ABSTRACT

A method is provided for determining the vanadium content of an ore formation employing neutron activation of the ore formation from within a bore hole.

1 Claim, 3 Drawing Figures

Patented July 17, 1973

3,746,871

INVENTORS
FRANK J. COSOLITO
HENRY H. KRAMER
C. SHELDON THOMPSON
BY
ATTORNEY

METHOD OF DETERMINING THE PRESENCE AND AMOUNT OF VANADIUM IN AN EARTH FORMATION

This invention relates to a method of radioactive logging to determine the presence and amount of vanadium in an earth formation. More particularly the present invention relates to a method of employing a neutron source to determine the presence and quantity of vanadium in an earth formation containing both vanadium and aluminum.

The use of a neutron source in analyzing earth formations whereby the formation is bombarded with neutrons and activity induced in the constituents of the earth formation has been used in the past and is known as neutron activation analysis (NAA).

It has been known to employ a neutron source to irradiate earth formations to induce gamma ray emissions therefrom and thereby locate the interface between oil and water in underground earth formations as described in U.S. Pat. No. 3,215,837. It has also been suggested that such a technique could be used to locate and measure the amounts of various metals in underground earth formations. However up to the present, no satisfactory method has been known for the measurement of the vanadium content of underground earth formations which also contain aluminum through the use of neutron activation.

It is therefore an object of the present invention to provide a method for the measurement of the vanadium content of underground earth formations using neutron activation.

Figure 1:
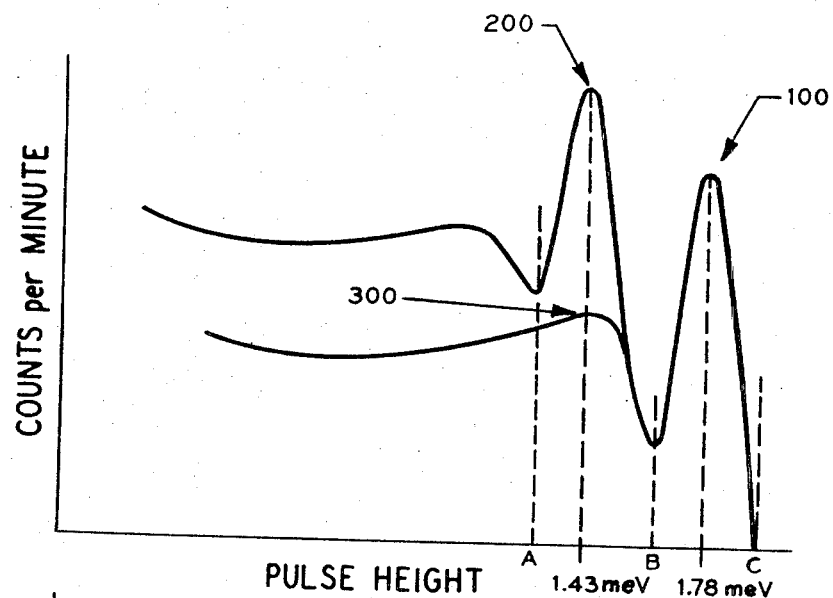
Figure 2:
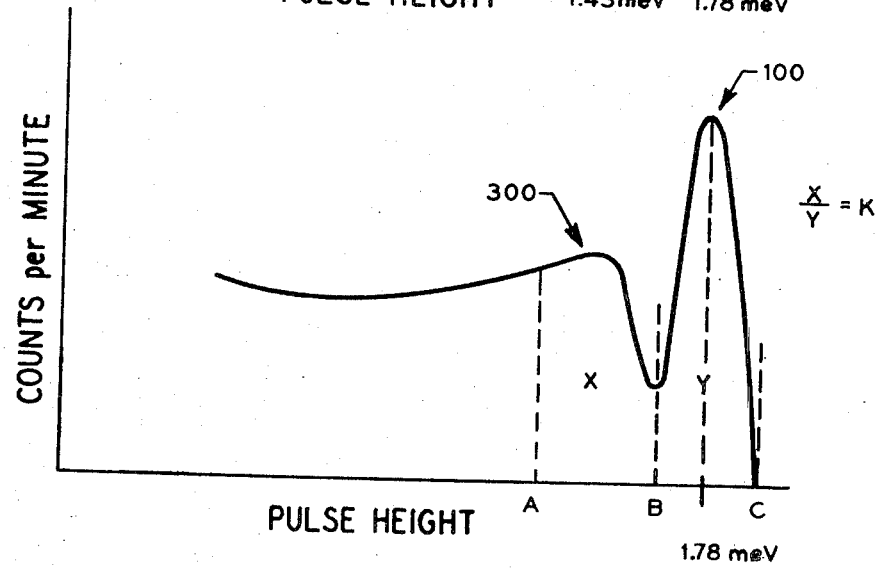
Figure 3:
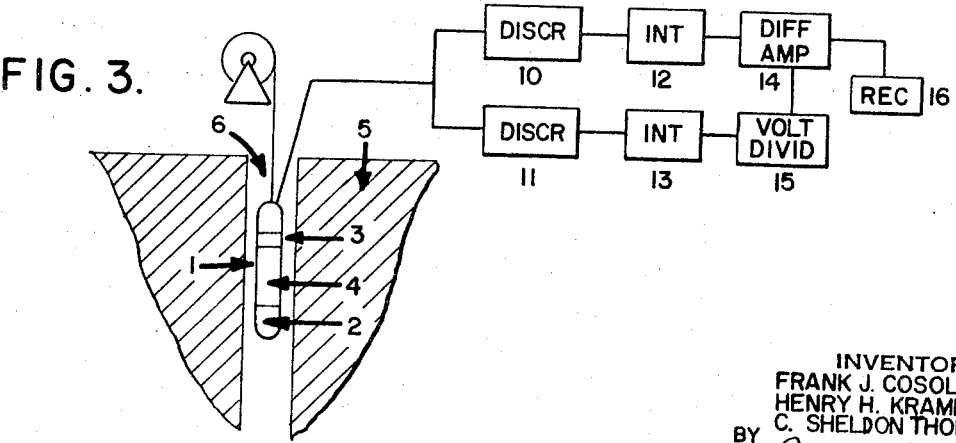

Other objects will be apparent from the following description and claims taken in conjunction with the drawing in which FIG. 1 is a graphical representation of a scintillation detector response to the gamma rays from vanadium and aluminum after activation by a neutron source FIG. 2 is a graphical representation of a scintillation detector response to the gamma rays from aluminum only, after activation by a neutron source, and FIG. 3 is a schematic presentation of an apparatus arrangement suitable for the practice of the present invention.

In the practice of the present invention a conventional scintillation detector means is employed which comprises a scintillation crystal and a photomultiplier tube, the output of which is eventually detected as a counting rate, i.e. the detected gamma rays per unit of time, e.g. counts per minute.

The scintillation detector means is used as a spectrometer wherein a signal is provided depending on the manner in which a gamma ray interacts with the crystal of the scintillation detector. Totally absorbed gamma rays result in a relatively narrow characteristic peak; gamma rays which are scattered in the crystal result in a spectrum due to Compton scattering.

A method in accordance iwth the present invention for indicating the presence of vanadium in an earth formation which also contains aluminum comprises irradiating the formation from within a bore hole with neutrons to provide decay gamma emissions; detecting the decay gamma emissions by scintillation detector means; generating a first signal proportional to the counting rate of the detected radiation within a predetermined energy range which is characteristic of neutron activated vanadium; generating a second signal proportional to the counting rate of the detected radiation within a predetermined energy range within which the counting range is substantially exclusively due to radiation from neutron activated aluminum; attenuating the second signal by a factor equal to the ratio of the emission due to Compton scattering of neutreon activated aluminum in the aforesaid predetermined energy range which is characteristic of neutron activated vanadium to the emission of neutron activated aluminum which is totally absorbed by scintillation detector means; providing a signal proportional to the difference between the first signal and the attenuated second signal; and recording this difference.

Vanadium 51 when bombarded with neutrons can be transmuted to vanadium 52 which is radioactive and has a characteristic half life and decays with a characteristic emmission including a 1.43 mev. gamma ray that appears as a peak in a gamma ray spectrum detected by scintillation detector means.

Aluminum 27 when bombarded with neutrons can be transmuted to aluminum 28 which is radioactive and has a characteristic half life and decays with a characteristic emission including a 1.78 mev. gamma ray that appears as a peak in a gamma ray spectrum detected by scintillation detector means. The gamma ray spectrum for aluminum 28, however, also includes a Compton spectrum, the leading edge of which is at 1.43 mev. and coincides with the vanadium peak in a gamma ray spectrum.

With reference to FIG. 1 upon neutron irradiation of an earth formation containing both vanadium and aluminum, gamma ray emissions from the formation are obtained which are a composite of the gamma emissions from both aluminum and vanadium in the energy range A–C, i.e. from about 0.80 to 2.00 mev. In FIG. 1 numeral 100 indicates the emission due exclusively to aluminum at an energy of 1.78 mev which is detected in the energy range B–C; numeral 200 indicates the composite emission which is detected in the energy range A–B and at 1.43 mev is due to vanadium in combination with the Compton contribution of aluminum which is indicated at 300. Since the energy range A–B for vanadium is virtually the same as the aluminum Compton contribution, it can be seen that it is not practically possible to obtain a measurement of the emission due only to vanadium when aluminum is present.

With reference to FIG. 2, the graph thereof shows the emission due only to aluminum in the energy range A–C which can be obtained by irradiating an earth formation which contains aluminum but no vanadium. For example a non-vanadium containing portion of the ore body under study can be irradiated with neutrons to obtain such emissions or a different vanadium free ore body can be irradiated. With further reference to FIG. 2, the aluminum Compton scattering or spectrum is shown at 300 and the aluminum emission totally absorbed by scintillation detector means is shown at 100 at 1.78 mev. For a given scintillation detector, the ratio of the area X to area Y is a constant. That is, the ratio of the number of gamma ray pulses falling within energy range A–B to the number of gamma ray pulses in the range B–C provides a constant factor $K$ where $K = X/Y$. This factor, when applied to the gamma ray pulses in the energy range B–C, provides a signal corresponding only to the Compton contribution of aluminum.

Thus, with reference to FIG. 1, by subtracting from a signal corresponding to the gamma ray pulses in the energy range A-B, a signal equal to K times the pulses in the energy range B-C, a signal can be obtained which is due only to radioactive vanadium and is proportional to the vanadium present in the ore surrounding the bore hole.

In the practice of the present invention, and with reference to FIG. 3 of the drawing, a capsule 1 e.g. a steel pipe containing a neutron source 2, e.g. PoBe, AmBe, PuBe, or Cf-252, and detector 3 e.g., comprising a NaI(Tl) or a CsI(Na) crystal, and a photomultiplier tube, the neutron source 2 and detector 3 being shielded from each other by a suitable material 4 e.g. polyethylene rod and lead, is lowered into a bore hole 6 in an earth formation 5. The earth formation 5 is irradiated by the neutron source 2 for a predetermined time and subsequently the capsule 1 is lowered placing the detector 3 at the same point previously irradiated by the source 2. The signal developed by the detector 3 is a composite of the induced gamma radiations from both vanadium and aluminum as previously described and is illustrated in FIG. 1 of the drawing.

This composite signal is fed to a conventional discriminator circuit 10 for example of the type disclosed in U.S. Pat. No. 3,336,476 which is routinely adjusted to pass only the pulses in the energy range A-B as shown in FIG. 1 of the drawing, which includes pulses due to vanadium and the Compton contribution due to aluminum. The output of discriminator 10 is passed to an integrating circuit 12 which integrates the pulses to produce a signal proportional to the counting rate of the detected radiation in the energy range A-B which is proportional to the radiation due to vanadium and the Compton contribution due to aluminum.

The composite signal is also fed to a second conventional discriminator 11 which passes only the pulses in the energy range B-C which are due only to aluminum. The output of discriminator 11 is passed to integrating circuit 13 which integrates the pulses to produce a signal proportional to the counting rate of the detected radiation in the energy range B-C which is, as above noted, proportional to the radiation due to aluminum only. The output from integrating circuit 13 is fed to a voltage dividing circuit 15 which attenuates the signal by the factor K which is the ratio of the pulses due to aluminum falling within the energy range of A-B to those falling within the energy range B-C as aforedescribed. The outputs of integrating circuit 12 and voltage dividing circuit 15 are applied to a difference amplifier 14. The output of difference amplifier 14 corresponds to radiation due to vanadium only and this signal, which is proportional to the vanadium content of the ore formation is applied to a conventional recorder e.g. Mosely Model No. 680 Strip Chart Recorder.

In view of the foregoing, it is seen that an effective method is provided for the bore hole measurement of vanadium in the presence of aluminum.

What is claimed is:

1. The method of indicating the presence of vanadium in an earth formation which also contains aluminum comprising
   a. irradiating the earth formation from within the bore hole with neutrons to provide decay gamma emmissions
   b. detecting the decay gamma emmissions by scintillation detector means
   d. generating a first signal proportional to the counting rate of the detected radiation within a predetermined energy range which is characteristic of neutron activated vanadium
   e. generating a second signal proportional to the counting rate of the detected radiation within a predetermined energy range within which the counting rate is substantially exclusively due to radiation from neutron activated aluminum.
   f. attenuating the second signal by a factor equal to the ratio of the emmission due to aluminum Compton scattering of neutron activated aluminum to the emission of neutron activated aluminum which is totally absorbed by the scintillation detector means
   g. producing a signal proportion to the difference between the first signal and the attenuated signal, and
   h. recording this difference, said difference being proportional to the amount of vanadium present in the earth junction surrounding the bore hole.

* * * * *